United States Patent
Kim et al.

(10) Patent No.: US 7,944,363 B2
(45) Date of Patent: May 17, 2011

(54) APPARATUS AND METHOD OF SENSING LEAKAGE OF CHEMICAL LIQUID

(75) Inventors: Hee-Suk Kim, Gyeonggi-do (KR); Tai-Kweon Lim, Gyeonggi-do (KR)

(73) Assignee: Semes Co., Ltd. (KR)

( * ) Notice: Subject to any disclaimer, the term of this patent is extended or adjusted under 35 U.S.C. 154(b) by 274 days.

(21) Appl. No.: 12/211,349

(22) Filed: Sep. 16, 2008

(65) Prior Publication Data

US 2009/0091461 A1    Apr. 9, 2009

(30) Foreign Application Priority Data

Oct. 4, 2007  (KR) .................. 10-2007-0099922

(51) Int. Cl.
*G08B 21/00* (2006.01)
(52) U.S. Cl. ............ 340/605; 340/606; 73/40; 137/551
(58) Field of Classification Search .................. 340/605, 340/606; 73/861, 40.5 A, 40; 137/312, 551, 137/557
See application file for complete search history.

(56) References Cited

U.S. PATENT DOCUMENTS

| 5,476,004 | A | * | 12/1995 | Kingsford | 73/40 |
| 6,134,949 | A | * | 10/2000 | Leon et al. | 73/40.5 A |
| 6,513,542 | B1 | * | 2/2003 | Hsieh | 137/312 |
| 6,592,126 | B2 | * | 7/2003 | Davis | 277/320 |

FOREIGN PATENT DOCUMENTS

KR    1020020054698 A    7/2002

OTHER PUBLICATIONS

Korean Office Action for Korean Patent Application No. 10-2007-0099922 issued Aug. 29, 2008.

* cited by examiner

*Primary Examiner* — Toan N Pham
(74) *Attorney, Agent, or Firm* — Myers Bigel Sibley & Sajvec, P.A.

(57) ABSTRACT

An apparatus and method of sensing leakage of chemical liquid is provided. The apparatus for sensing leakage of chemical liquid, includes a sensing unit measuring a flow rate of chemical liquid being supplied to a process chamber, a process control unit judging whether leakage of the chemical liquid has occurred using the measured flow rate of the chemical liquid and generating a control signal, and an equipment control unit receiving an input of the control signal and controlling an operation of equipment.

16 Claims, 5 Drawing Sheets

APPARATUS AND METHOD OF SENSING LEAKAGE OF CHEMICAL LIQUID

CROSS-REFERENCE TO RELATED APPLICATION

This application is based on and claims priority from Korean Patent Application No. 10-2007-0099922, filed on Oct. 4, 2007, in the Korean Intellectual Property Office, the disclosure of which is incorporated herein in its entirety by reference.

BACKGROUND OF THE INVENTION

1. Field of the Invention

The present invention relates to an apparatus and method of sensing leakage of chemical liquid, and more particularly to an apparatus and method of sensing leakage of chemical liquid, which can sense the leakage of chemical liquid using a flow meter not only in a standby step but also during the proceeding of a process.

2. Description of the Prior Art

Recently, image display devices, such as a liquid crystal display (LCD), a plasma display panel (PDP), and the like, have been rapidly replacing a conventional CRT. Such display devices use a substrate commonly called a flat panel display (FPD).

In order to manufacture a flat panel display, many processes, such as a substrate manufacturing process, a cell manufacturing process, a module manufacturing process, and the like, should be performed. Particularly, in order to form various kinds of patterns on a substrate in the substrate manufacturing process, a photolithography technology is typically used, starting from a cleaning process.

The photolithography technology includes coating photoresist on a layer material formed on the substrate; drying a photoresist solvent in order to volatilize the photoresist solvent; performing a soft baking of the photoresist at a relatively low temperature; putting a photomask on the photoresist and then exposing the photoresist layer in accordance with a pattern formed on the photomask; developing the exposed photoresist layer; performing a hard baking of the developed photoresist at a relatively high temperature; and patterning the layer material exposed through the photoresist layer.

On the other hand, in many processes including the photoresist coating process, various kinds of chemical liquids are dispensed onto the substrate using a slit nozzle and so on. Accordingly, it is very important to sense and prevent leakage of chemical liquids which may occur in a valve or a pipe when the chemical liquids are dispensed.

Conventionally, in order to sense the leakage of chemical liquid, a capacitance type sensor has been used. The capacitance type sensor is a non-contact type sensor which uses a change of capacitance between an object to be detected and the ground, and outputs a detection signal when an object to be detected approaches a detection surface of the sensor. If an object to be detected approaches, the capacitance of the sensor is increased as the polarization thereof is increased due to static induction, while if the object becomes apart from the detection surface of the sensor, the capacitance of the sensor is decreased as the polarization thereof is decreased. The capacitance type sensor senses the existence/nonexistence of the object by detecting the amount of change of the capacitance. Specifically, the capacitance type sensor detects the object in a manner that if the object approaches the sensor, the capacitance of the sensor is increased to cause the vibration breadth of an output voltage of the sensor also to be increased, and an output unit of the sensor is operated through amplification of the vibration breadth of the voltage to detect the object. By using the capacitance type sensor, not only the position detection and fixed-position stop control of the object can be performed but also the existence/nonexistence and level of the liquid can be detected.

Conventionally, in order to sense the leakage of the chemical liquid, a flow meter has also been used. The amount of leakage of the chemical liquid is measured using the flow meter, and if the measured amount of leakage exceeds a predetermined value, the leakage state of the chemical liquid is reported to a user.

However, the conventional apparatus for sensing the leakage of the chemical liquid has the following problems.

In the case of sensing the leakage of the chemical liquid using the capacitance type sensor, a small amount of leakage of the chemical liquid cannot be sensed. In particular, the leakage of the chemical liquid occurring on a back side of the substrate cannot be sensed. Accordingly, in order to sense such a small amount of leakage of the chemical liquid, a separate sensor should be installed.

Also, in the case of sensing the leakage of the chemical liquid using the flow meter, the leakage can be detected only in a standby step before the whole process is performed. Accordingly, during the proceeding of the process or in a state that dispensing of the chemical liquid is interrupted, the leakage of the chemical liquid cannot be sensed.

SUMMARY OF THE INVENTION

Accordingly, the present invention has been made to solve the above-mentioned problems occurring in the prior art, and an object of the present invention is to provide an apparatus and method of sensing leakage of chemical liquid, which can sense the leakage of chemical liquid using a flow meter not only in a standby step but also during the proceeding of a process, so that a loss of a substrate and the inferiority of a process due to leakage of chemical liquid are prevented and thus the process efficiency is improved.

Additional advantages, objects, and features of the invention will be set forth in part in the description which follows and in part will become apparent to those having ordinary skill in the art upon examination of the following or may be learned from practice of the invention.

In order to accomplish these objects, there is provided an apparatus for sensing leakage of chemical liquid, according to the present invention, which includes a sensing unit measuring a flow rate of chemical liquid being supplied to a process chamber; a process control unit judging whether leakage of the chemical liquid has occurred using the measured flow rate of the chemical liquid and generating a control signal; and an equipment control unit receiving an input of the control signal and controlling an operation of equipment.

In another aspect of the present invention, there is provided a method of sensing leakage of chemical liquid, which includes measuring a flow rate of chemical liquid being supplied to a process chamber; judging whether leakage of the chemical liquid has occurred using the measured flow rate of the chemical liquid; generating a control signal depending on whether the leakage of the chemical liquid has occurred; and receiving an input of the control signal and controlling an operation of equipment.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
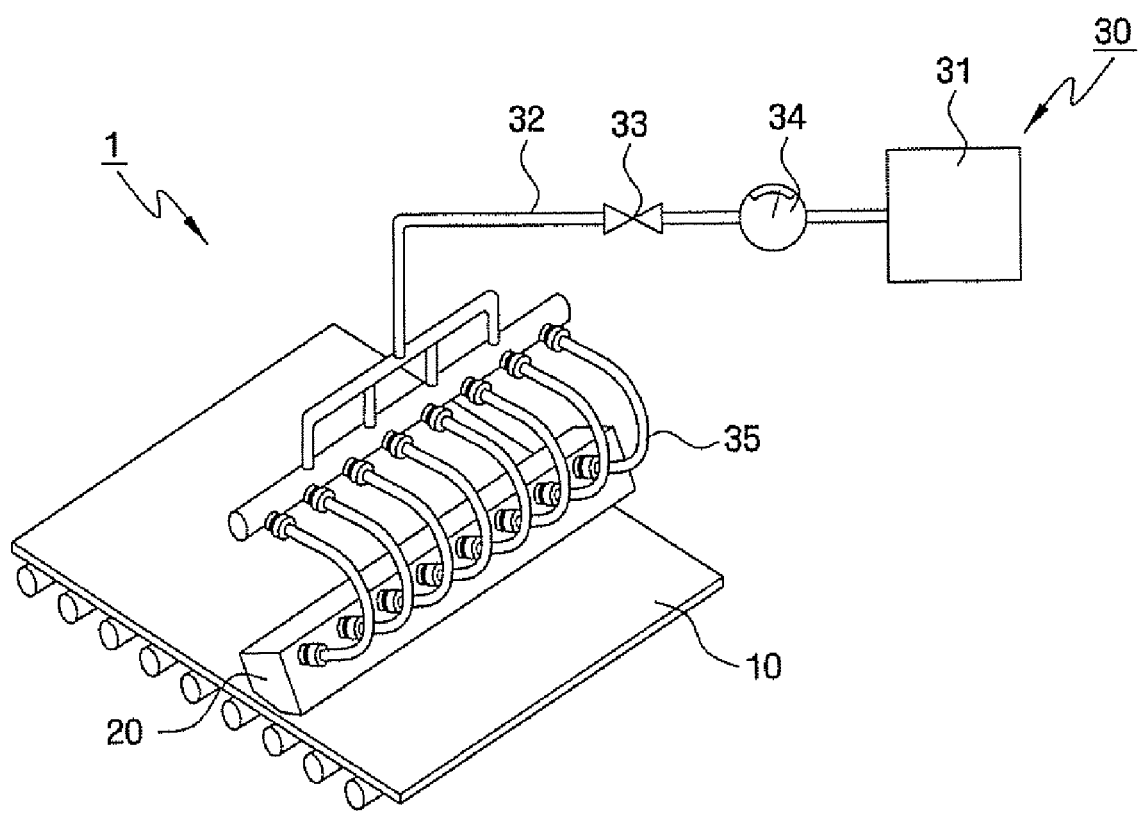
FIG. 1 is a perspective view schematically illustrating a typical apparatus for coating chemical liquid for manufacturing a flat panel device.

Hereinafter, preferred embodiments of the present invention will be described in detail with reference to the accompanying drawings. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

Hereinafter, with reference to accompanying drawings, an apparatus and method of sensing leakage of chemical liquid according to embodiments of the present invention will be described in detail.

FIG. 1 is a perspective view schematically illustrating a typical apparatus for coating chemical liquid for manufacturing a flat panel device.

Although diverse kinds of semiconductor manufacturing equipment have been used, an apparatus for coating chemical liquid for manufacturing a flat panel device will now be described as an example.

As illustrated in FIG. 1, the chemical liquid coating apparatus 1 for coating chemical liquid for manufacturing a flat panel display includes a slit nozzle 20 coating the chemical liquid on a substrate 10, and a chemical liquid supply unit 30 supplying the chemical liquid to the slit nozzle 20.

Here, the chemical liquid supply unit 30 includes a chemical liquid storage unit 31 keeping and supplying the chemical liquid, a pipe 32 connected to the chemical liquid storage unit 31 to transfer the chemical liquid, a valve 33 adjusting an amount of supply of the chemical liquid, a flow meter 34 measuring the amount of supply of the chemical liquid, and chemical liquid supply lines 35 connected between the slit nozzle 20 and the pipe 32 to supply the chemical liquid to the slit nozzle 20.

The chemical liquid storage unit 31 stores therein the chemical liquid to be coated on the surface of the substrate 10, for example, a developer (e.g., 2.38% TMAH solution).

The pipe 32 serves to transfer the chemical liquid, and is provided with the valve 33 for adjusting the amount of supply of the chemical liquid. The pipe 32 is connected to the slit nozzle 20 through the chemical liquid supply lines 35, and uniformly supplies the chemical liquid to the whole slit nozzle 20 through the chemical liquid supply lines 35.

The valve 33 fixedly sets the flow rate of the chemical liquid being sprayed in order to adjust the amount of supply of the chemical liquid. Preferably, a solenoid valve may be used to adjust the amount of supply of the chemical liquid.

The flow meter 34 serves to measure the amount of supply of the chemical liquid, and may be installed on the pipe 32.

The chemical liquid supply lines 35 may be formed of perfluoroalkoxy (PFA) tube, and in order to rapidly and uniformly supply the chemical liquid from the pipe 32 to the slit nozzle 20, a plurality of chemical liquid supply lines may be provided. In order to make bubbles generated inside the pipe 32 rise toward the pipe 32 without remaining in the slit nozzle 20, the chemical liquid supply line 35, as illustrated in FIG. 1, is lengthened in "⊃" shape so that a space required for the bubbles to rise upward can be secured.

In a semiconductor manufacturing process or a flat panel display manufacturing process, the slit nozzle 20 is used in a slit type coating apparatus which uniformly coats the chemical liquid on the surface of the substrate 10 through the nozzle longitudinally formed in a width direction of the substrate 10. The chemical liquid coating apparatus 1, in order to uniformly coat the chemical liquid on the surface of the substrate 10, is provided with one or more slit nozzles 20 having different flow rates of chemical liquid. In order to uniformly spray the chemical liquid on the substrate 10, the slit nozzle 20 or the substrate 10 is moved during the coating process.

Figure 2:
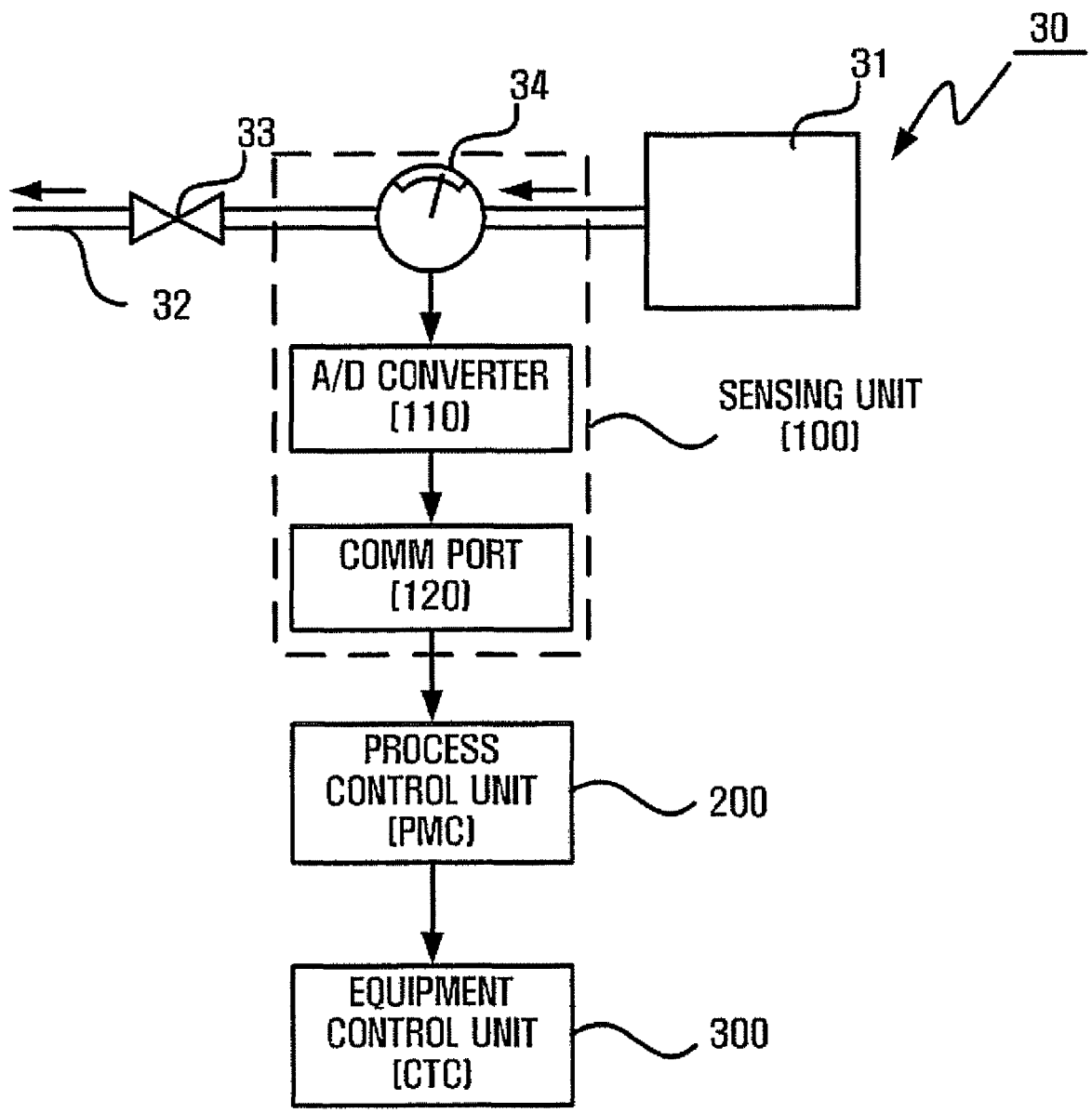
FIG. 2 is a block diagram illustrating the configuration of an apparatus for sensing leakage of chemical liquid according to an embodiment of the present invention.

FIG. 2 is a block diagram illustrating the configuration of an apparatus for sensing leakage of chemical liquid according to an embodiment of the present invention.

The apparatus for sensing leakage of chemical liquid according to an embodiment of the present invention includes a sensing unit 100, a process control unit 200, and an equipment control unit 300.

The sensing unit 100 serves to measure the flow rate of the chemical liquid being supplied to a process chamber. Preferably, the sensing unit 100 measures in real time the amount of supply of the chemical liquid per unit time using a flow meter. The flow meter is a meter for measuring the flow rate of gas or liquid, and may be installed on the chemical liquid supply unit 30 supplying the chemical liquid to the slit nozzle 20, for example, on the pipe 32, as illustrated in FIG. 1.

On the other hand, the sensing unit 100 may include an analog-to-digital (A/D) converter converting analog data of the flow rate of the chemical liquid measured by the flow meter into digital data, and a communications (comm) port controlling the flow meter. The A/D converter and the communications port can transmit/receive flow rate data through RS-232 type communications.

The process control unit 200 serves to judge whether the leakage of the chemical liquid has occurred using the flow rate of the chemical liquid measured by the sensing unit 100, and generate a control signal.

In order to judge whether the leakage of the chemical liquid has occurred, the process control unit 200 confirms the followings.

First, the process control unit 200 judges whether the chemical liquid is normally dispensed. The normal dispensing of chemical liquid refers to the dispensing of chemical liquid through the slit nozzle 20 in order to perform the coating process. That is, in the case of dispensing the chemical liquid on the substrate 10, the process control unit 200 judges that the leakage of the chemical liquid has not occurred. In this case, the amount of supply of the chemical liquid required for the dispensing of chemical liquid is predetermined, and whether the leakage of the chemical liquid has occurred is judged by measuring the flow rate of the chemical liquid being actually supplied. Also, as an example of the normal dispensing of the chemical liquid, a dummy dispense of chemical liquid may be performed for the purpose of experimentally operating the chemical liquid coating apparatus 1 before or after the proceeding of the process.

Then, the process control unit 200 judges whether a set delay time has elapsed after the dispensing of the chemical liquid. If the set delay time has elapsed after the dispensing of the chemical liquid, the process control unit 200 judges that the leakage of the chemical liquid has occurred.

Also, the process control unit 200 judges whether the flow rate of the chemical liquid exceeds an initial set value. In order to judge the leakage of the chemical liquid, the initial set value that corresponds to the normal flow rate of the chemical liquid is designated. If the actually measured flow rate of the chemical liquid exceeds the initial set value, the process control unit 200 judges that the leakage of the chemical liquid has occurred.

The order of judgment of the chemical liquid leakage is not fixed, but may be changed by the existing state of things.

On the other hand, if the leakage of the chemical liquid has occurred, the process control unit 200 judges whether the leakage of the chemical liquid has occurred in a state that the process is performed.

Conventionally, in the case of sensing the leakage of the chemical liquid using the flow meter, the leakage can be detected only in a standby step before the whole process is performed. Accordingly, during the proceeding of the process or in a state that the dispensing of the chemical liquid is interrupted, the leakage of the chemical liquid cannot be sensed.

However, according to the apparatus for sensing the leakage of the chemical liquid according to an embodiment of the present invention, the leakage of the chemical liquid can be sensed using the flow meter not only in a standby step but also during the proceeding of the process, and thus a loss of a substrate and the inferiority of a process due to leakage of chemical liquid are prevented with the process efficiency improved. Also, even a small amount of leakage can be sensed without any additional sensor, and thus the manufacturing cost can be reduced.

After the judgment of the leakage of the chemical liquid, the process control unit 200 generates a corresponding control signal. Preferably, the process control unit 200 generates a control signal in the form of interlock information, depending on whether the leakage of the chemical liquid has occurred. The process control unit 200 transmits the generated control signal to the equipment control unit 300.

Preferably, the process control unit 200 uses a process module control (PMC).

The equipment control unit 300 receives the control signal generated from the process control unit 200, and controls the operation of the equipment. Preferably, the equipment control unit 300 informs the user of the control signal in the form of an alarm, and if the leakage of the chemical liquid has occurred, it stops the proceeding of the process of the equipment. That is, if the leakage of the chemical liquid has occurred, the equipment control unit 300 informs the user of the interlock information generated from the process control unit 200 in the form of an alarm through a monitoring unit or a display unit. Also, since the equipment control unit 300 stops the proceeding of the process of the equipment, a loss of the substrate and the inferiority of the process due to the leakage of the chemical liquid are prevented.

Preferably, the equipment control unit 300 uses a cluster tool controller (CTC).

Figure 3:
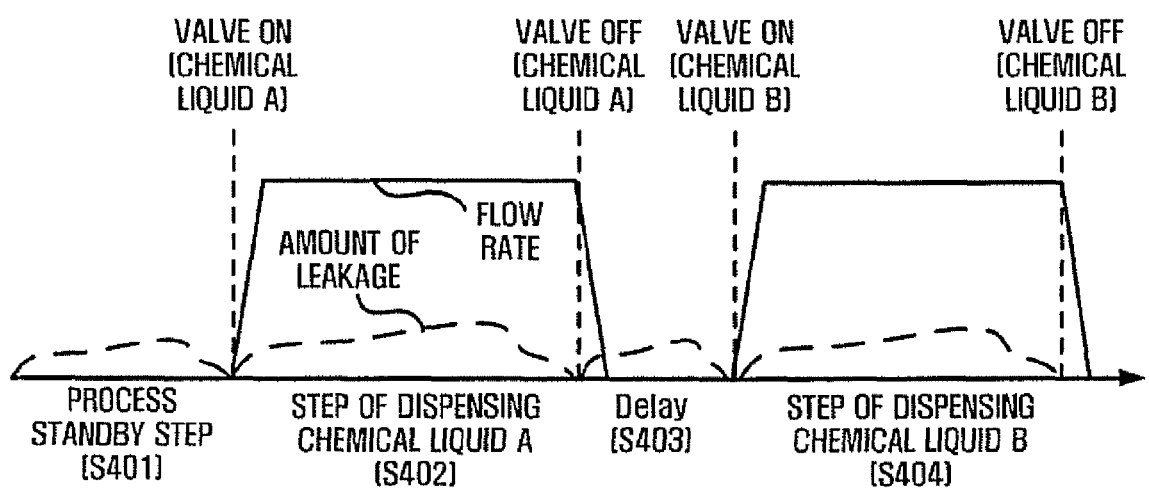
FIG. 3 is a view explaining the judgment of leakage of chemical liquid during the proceeding of a process using the apparatus for sensing the leakage of the chemical liquid as illustrated in FIG. 2.

FIG. 3 is a view explaining the judgment of the leakage of the chemical liquid during the proceeding of the process using the apparatus for sensing the leakage of the chemical liquid as illustrated in FIG. 2.

In FIG. 3, the whole process, in which the chemical liquid coating apparatus 1 performs a coating process with respect to one substrate 10, is schematically illustrated. Here, it is exemplified that the coating process is performed by dispensing two kinds of chemical liquids, i.e., chemical liquid A and chemical liquid B.

A process standby step S401 is a step before the whole process is performed, and particularly means a step before starting the coating process or after completion of the coating process. In the process standby step S401, the chemical liquid may be dispensed for the purpose of experimentally operating and testing the chemical liquid coating apparatus 1. In this case, the amount of supply of the chemical liquid required for the dispensing of the chemical liquid is predetermined, and whether the leakage of the chemical liquid has occurred is judged by measuring the flow rate of the chemical liquid being actually supplied.

Dispensing chemical liquid A S402 corresponds to performing a coating process by dispensing chemical liquid A on the substrate 10. In S402, a supply unit supplies chemical liquid A by opening the valve. In the same manner as described above, the amount of supply of the chemical liquid required for the dispensing of the chemical liquid A is predetermined, and whether the leakage of the chemical liquid A has occurred is judged by measuring the flow rate of the chemical liquid A being actually supplied. At this time, whether the leakage of chemical liquid B, which has not been dispensed, has occurred is also judged.

Delay S403 means a time period before chemical liquid B is dispensed after completion of dispensing of chemical liquid A. At this time, in order to interrupt the dispensing of chemical liquid A, the supply unit supplying chemical liquid A closes the valve, and just after the closing of the valve, it is judged whether chemical liquid A has leaked.

Dispensing chemical liquid B S404 corresponds to performing a coating process by dispensing chemical liquid B. In S404, a supply unit supplying chemical liquid B measures whether chemical liquid B has leaked by measuring the flow rate of chemical liquid B, and also judges whether the chemical liquid A, which has not been dispensed, has leaked.

As described above, the leakage of chemical liquid is sensed in real time in the whole coating process, and thus a loss of the substrate and the inferiority of the process due to the leakage of the chemical liquid are prevented.

Hereinafter, a method of sensing the leakage of the chemical liquid using the apparatus for sensing the leakage of the chemical liquid according to an embodiment of the present invention will be described.

Figure 4:
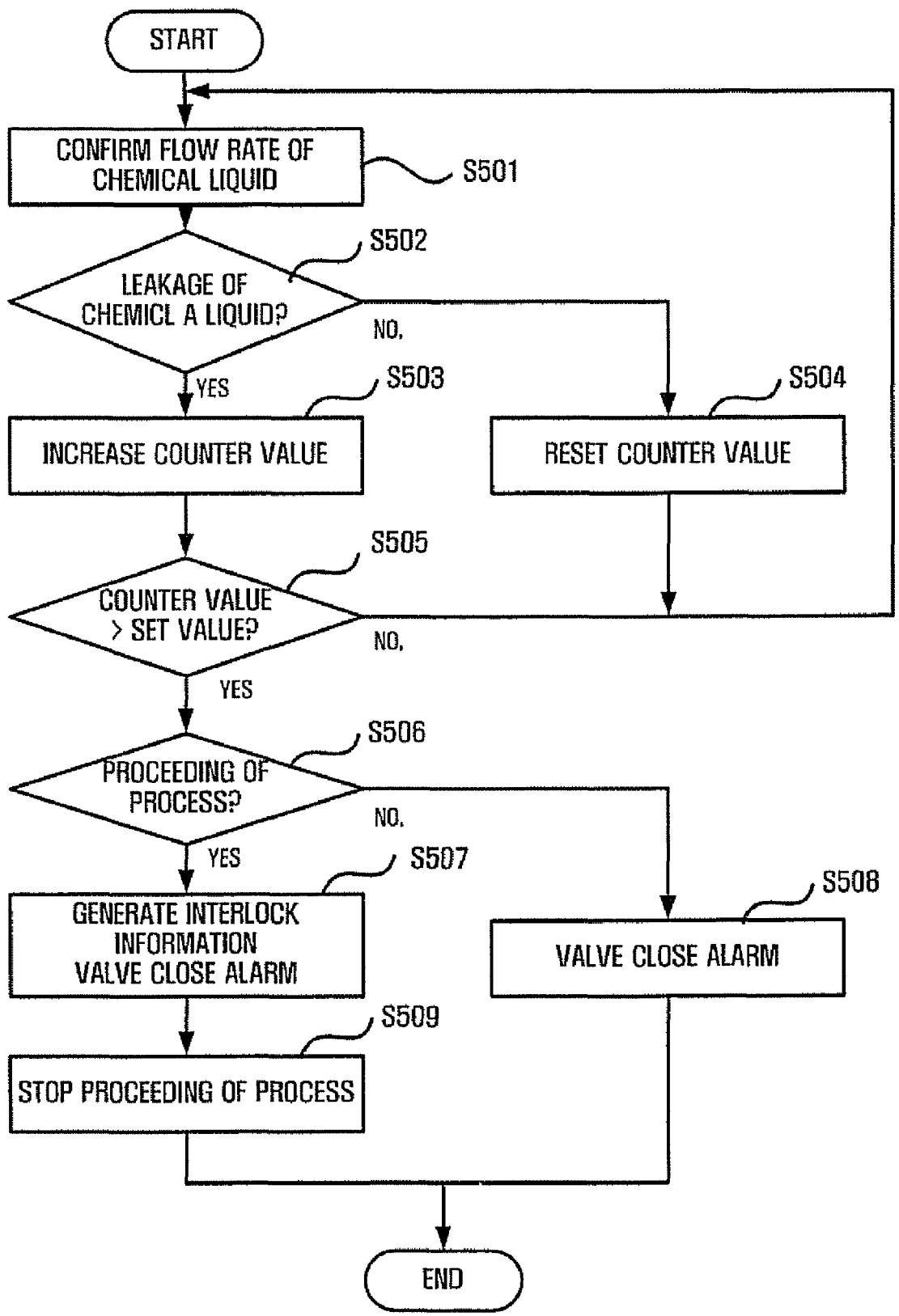
FIG. 4 is a flowchart illustrating a method of sensing leakage of chemical liquid using an apparatus for sensing leakage of chemical liquid according to an embodiment of the present invention.

FIG. 4 is a flowchart illustrating a method of sensing the leakage of the chemical liquid using the apparatus for sensing the leakage of the chemical liquid according to an embodiment of the present invention.

First, the sensing unit 100 measures the flow rate of the chemical liquid being supplied from the chemical liquid supply unit 30 to the process chamber S501. Then, the process control unit 200 judges whether the leakage of chemical current has occurred using the measured flow rate of the chemical liquid S502.

On the other hand, in order to finally judge the leakage of the chemical liquid, a value predetermined by a user may be used. That is, if the leakage of the chemical liquid has occurred, the process control unit 200 increases a counter value stored therein S503, and if the counter value exceeds the value predetermined by the user S505, it finally judges that the leakage of the chemical liquid has occurred. By contrast, if the process control unit 200 judges that the leakage of the chemical liquid has not occurred, it initializes the counter value by resetting the counter value S504. For example, if the value predetermined by the user is "3", the process control unit 200 finally judges that the leakage of the chemical liquid has occurred when the number of times the process control unit 200 judges the leakage of the chemical liquid becomes "3".

If the process control unit 200 finally judges that the leakage of the chemical liquid has occurred, it may further judge whether the leakage of the chemical liquid has occurred in a state that a coating process is performed S506. If the leakage of the chemical liquid has occurred in a state that the coating process is performed, the process control unit 200 generates and transmits interlock information to the equipment control unit 300 to inform the user of a valve close in the form of an alarm S507, and stops the process of the equipment S509. By contrast, if the leakage of the chemical liquid has occurred in a state that the coating process is not performed, the equipment control unit 300 informs the user of the valve close S508.

Figure 5:
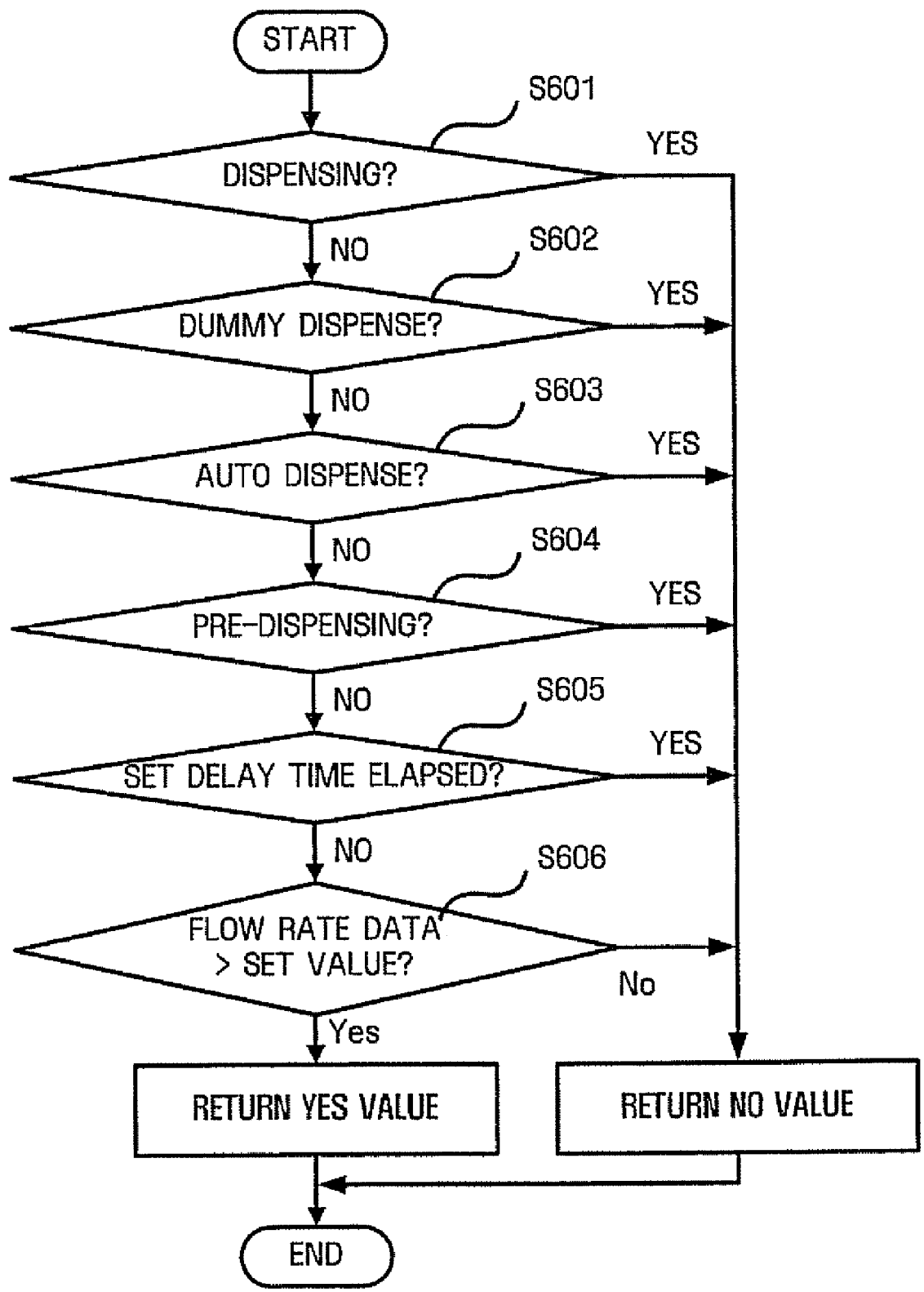
FIG. 5 is a flowchart illustrating a process of judging whether the leakage of chemical liquid has occurred in a method of sensing the leakage of the chemical liquid as illustrated in FIG. 4.

FIG. 5 is a flowchart illustrating a process of judging whether the leakage of the chemical liquid has occurred in the method of sensing the leakage of the chemical liquid as illustrated in FIG. 4.

In order to judge whether the leakage of the chemical liquid has occurred (See S502 in FIG. 4), the process control unit 200 judges whether the chemical liquid is normally dispensed S601 to S604. That is, the process control unit 200 judges that the leakage of the chemical liquid has not occurred in the case of dispensing the chemical liquid in order to perform the coating process S601, in the case of the dummy dispense dispensing the chemical liquid for test in the process standby step S602, in the case of an auto dispense S603, and in the case of a pre-dispense, respectively.

Then, the process control unit 200 judges whether the set delay time has elapsed S605 after the dispensing of the chemical liquid, and if the set delay time has elapsed, it judges that the leakage of the chemical liquid has occurred.

Also, the process control unit 200 judges whether the flow rate of the chemical liquid exceeds the initial set value S606, and if the actually measured flow rate of the chemical liquid exceeds the initial set value, it judges that the leakage of the chemical liquid has occurred.

As described above, the apparatus and method of sensing leakage of chemical liquid according to the present invention has one or more of the following effects.

First, the leakage of the chemical liquid can be sensed using the flow meter not only in the standby step but also during the proceeding of the process, and thus a loss of the substrate and the inferiority of the process due to the leakage of the chemical liquid are prevented with the process efficiency improved.

Second, even a small amount of leakage can be sensed without any additional sensor, and thus the manufacturing cost can be reduced.

In the embodiment of the present invention, the chemical liquid coating apparatus has been described as an example. However, the present invention can be applied not only to diverse kinds of semiconductor manufacturing equipment dispensing or spraying the chemical liquid but also to the sensing of the leakage of diverse kinds of fluids including the chemical liquid for process.

In the embodiment of the present invention, the substrate 10, which is for manufacturing of the flat panel display (FPD), is composed of a rectangular flat substrate, and the flat panel display may be a liquid crystal display (LCD), a plasma display panel (PDP), a vacuum fluorescent display (VFD), a field emission display (FED), or an electro luminescence display. Also, the substrate 10 may be a wafer used to manufacture a semiconductor chip.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An apparatus for sensing leakage of chemical liquid, comprising:
    a sensing unit measuring a flow rate of chemical liquid being supplied to a process chamber;
    a process control unit judging whether leakage of the chemical liquid has occurred using the measured flow rate of the chemical liquid and generating a control signal, wherein the process control unit judges whether the chemical liquid has been normally dispensed, whether a set delay time has elapsed after dispensing of the chemical liquid, and whether a flow rate of the chemical liquid exceeds an initial set value; and
    an equipment control unit receiving an input of the control signal and controlling an operation of equipment.

2. The apparatus of claim 1, wherein the sensing unit measures in real time an amount of supply of the chemical liquid per unit time using a flow meter.

3. The apparatus of claim 2, wherein the flow meter is installed in a supply unit of the chemical liquid.

4. The apparatus of claim 1, wherein the process control unit judges whether the leakage of the chemical liquid has occurred in a state that a process is performed.

5. The apparatus of claim 1, wherein the process control unit generates the control signal in the form of interlock information, depending on whether the leakage of the chemical liquid has occurred.

6. The apparatus of claim 1, wherein the process control unit uses process module control.

7. The apparatus of claim 1, wherein the equipment control unit informs a user of the control signal in the form of an alarm, and stops the proceeding of a process of the equipment if the leakage of the chemical liquid has occurred.

8. The apparatus of claim 1, wherein the equipment control unit uses a cluster tool controller.

9. A method of sensing leakage of chemical liquid, comprising:
    measuring a flow rate of chemical liquid being supplied to a process chamber;
    judging whether leakage of the chemical liquid has occurred using the measured flow rate of the chemical liquid, comprising:
        judging whether the chemical liquid has been normally dispensed;
        judging whether a set delay time has elapsed after dispensing of the chemical liquid; and
        judging whether a flow rate of the chemical liquid exceeds an initial set value;
    generating a control signal depending on whether the leakage of the chemical liquid has occurred; and receiving an input of the control signal and controlling an operation of equipment.

10. The method of claim 9, wherein the measuring comprises measuring in real time an amount of supply of the chemical liquid per unit time using a flow meter.

11. The method of claim 10, wherein the flow meter is installed in a supply unit of the chemical liquid.

12. The method of claim 9, wherein the judging further comprises judging whether the leakage of the chemical liquid has occurred in a state that a process is performed.

13. The method of claim 9, wherein the generating comprises generating the control signal in the form of interlock information, depending on whether the leakage of the chemical liquid has occurred.

14. The method of claim 9, wherein the judging uses process module control.

15. The method of claim 9, wherein the controlling comprises informing a user of the control signal in the form of an alarm, and stopping the proceeding of a process of the equipment if the leakage of the chemical liquid has occurred.

16. The method of claim 9, wherein the controlling uses a cluster tool controller.

* * * * *